United States Patent [19]

Ledan

[11] 4,049,339
[45] Sept. 20, 1977

[54] MOVIE VIEWING EYEGLASSES

[76] Inventor: Antoine Ledan, 417 E. 93rd St., Brooklyn, N.Y. 11212

[21] Appl. No.: 659,717

[22] Filed: Feb. 20, 1976

[51] Int. Cl.² .......................... G02C 7/16; G02B 27/02
[52] U.S. Cl. ........................................ 351/45; 350/144
[58] Field of Search ......................... 351/45; 350/144; 352/43

[56] References Cited

U.S. PATENT DOCUMENTS 1,636,450   7/1927   Ames .................................. 350/144

*Primary Examiner*—Paul A. Sacher
*Attorney, Agent, or Firm*—Allen D. Brufsky

[57] ABSTRACT

Eyeglasses used to provide depth simulation when worn to view a planar picture on a movie screen. The temples and frame of the eyeglasses are made from substantially rectangular opaque plastic and transparent, triangular shaped lenses are positioned in the frame adjacent a nosepiece cut therein. The lens and frame arrangement allow each eye to view the screen except for the corresponding edge thereof so that when the total picture is seen through both eyes the sensation of depth perception is realized.

5 Claims, 2 Drawing Figures

MOVIE VIEWING EYEGLASSES

BACKGROUND OF THE INVENTION

This invention relates to a pair of eyeglasses, and more particularly, a pair of eyeglasses especially adapted for viewing a movie screen to focus attention of the viewer on the screen and to provide a degree of depth simulation of the images projected on the screen.

It is known, as a psychophysiological phenomenon, that if a flat or planar picture is observed through a frame located at some distance before it, the elements of the picture seem to be staggered in depth behind the frame, giving a "3D" illusion. This phenomenon is known as the "window effect" and results essentially from the fact that the frame masks a part of the picture on the left side from the left eye and a part of the picture on the right side from the right eye; but when both eyes see the total picture the sensation of depth perception is realized.

SUMMARY OF THE INVENTION

Accordingly, it is an object of this invention to provide a pair of eyeglasses utilizing the "window effect" principle to enable a wearer to obtain depth simulation when viewing a planar picture, such as that projected on a movie screen.

A further object of this invention is to provide a pair of eyeglasses of the character indicated which when worn in the movies will also serve to focus the attention of the wearer on the screen to view the picture rather than being distracted by noise, lights or people moving about the theater.

These objects are accomplished by providing a pair of eyeglasses formed of opaque material including the temples, except for narrow, transparent triangular shaped lenses. The lenses allow each eye to view the screen except for the remote left and right edges which are masked from the left and right eyes, respectively, by the remaining opaque material of the eyeglass frame. This provides a degree of depth simulation to the wearer, while focusing the attention on the screen at the same time.

BRIEF DESCRIPTION OF THE DRAWING

Further objects and advantages of the invention will become more apparent from the following description and claims and from the accompanying drawing, wherein:

DETAILED DESCRIPTION OF THE PREFERRED EMBODIMENT

Figure 1:
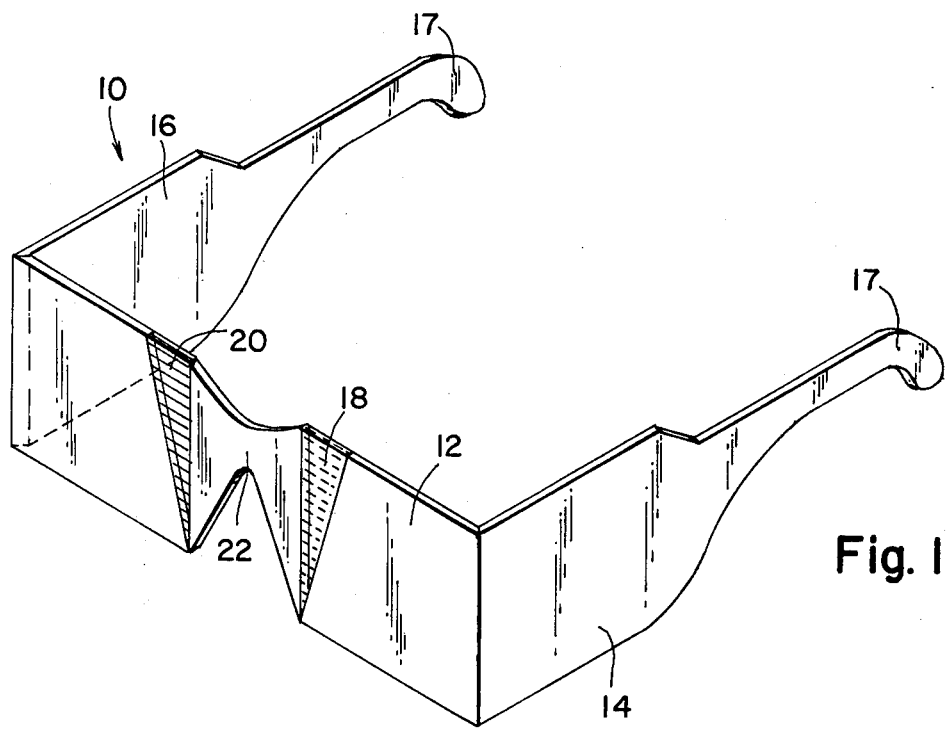
FIG. 1 is a front perspective view of the eyeglasses of the present invention.
Figure 2:
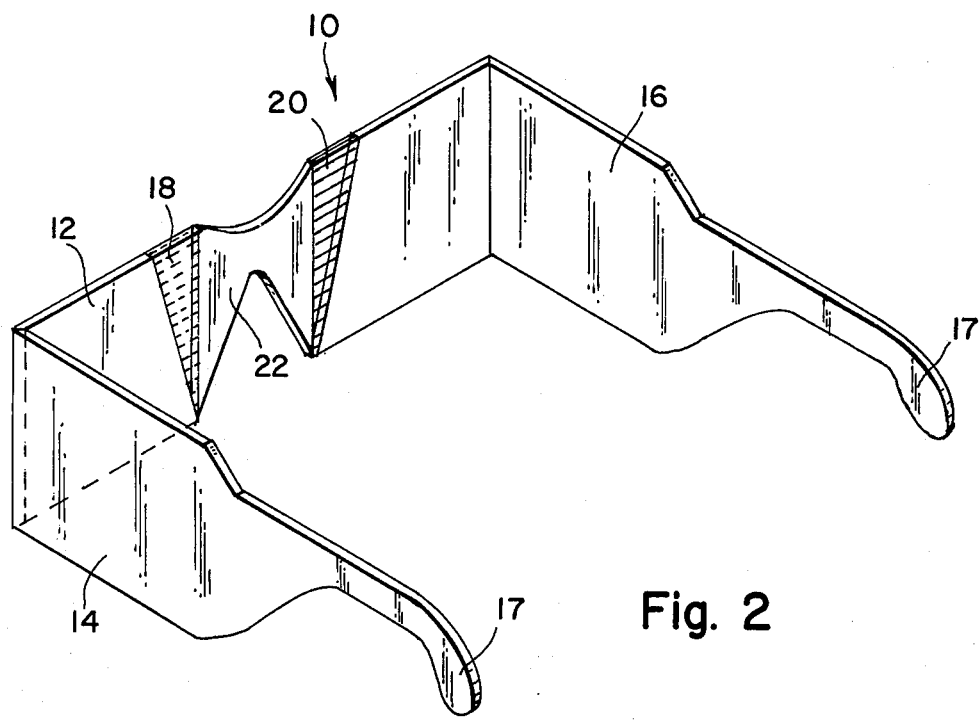
FIG. 2 is a back perspective view of the eyeglasses of FIG. 1.

Referring now to the drawing in detail, wherein like numerals indicate like elements throughout the several views, the eyeglasses of the present invention is designated by the numeral 10.

Eyeglasses 10 include a substantially rectangular frame 12 of opaque plastic material connected by conventional eyeglass hinges to a pair of substantial rectangular temples 14, 16 having ear pieces 17. Temples 14, 16 and earpieces 17 are made from the same opaque plastic material as frame 12. A pair of triangular-shaped lenses 18, 20 are held within the plane of 12 adjacent a nose piece or bridge 22 cut in frame 12.

Because of the opaque rectangular frame 12 and the opaque temples 14, 16 the eyes of the wearer of eyeglasses 10 will be directed towards the movie screen in a theater, rather than being distracted by noise, lights, or other movement in the theater. Further, the left opaque rectangular side of frame 12 and opaque temple 14 will tend to mask the left hand edge of the movie screen from the left eye, while the right rectangular opaque side of frame 12 and opaque temple 16 will tend to mask the right hand edge of the movie screen from the right eye. However, both eyes will view the entire two dimensional picture on the screen with the sensation of depth perception and simulation. The triangular shape of lenses 18 and 20 aid in this masking process and it has been found that the bottom angle of the lenses should be preferably on the order of 15° - 22°.

The depth simulation provided by eyeglasses 10 can be increased by tinting lenses 18 and 20 to filter and/or pass different colors. The differential of color incidence seen by each eye will in essence mask portions of the total image seen through each eye to increase the sensation of depth perception.

I claim:

1. A pair of eyeglasses for use in viewing a movie screen to provide depth simulation comprising:
   a frame formed from opaque material, having a nose piece,
   a temple formed from opaque material hingedly connected to each end of said frame, and
   a pair of transparent, triangular lenses in the plane of said frame on opposite sides of said nosepiece spaced from the ends of said frame connected to said temples.

2. A pair of eyeglasses in accordance with claim 1 wherein said lenses are treated to filter different colors.

3. A pair of eyeglasses in accordance with claim 1 wherein said frame and temples are formed from opaque plastic material.

4. A pair of eyeglasses in accordance with claim 1 wherein said frame and temples have contiguous portions which are substantially rectangular in shape.

5. A pair of eyeglasses in accordance with claim 1 wherein said triangular lenses have a bottom angle of between 15° - 22°.

* * * * *